Nov. 28, 1933.                E. WHITE                 1,937,213
                      MAGNETIC INDUCTION MACHINE
                      Filed Oct. 24, 1931        5 Sheets-Sheet 1
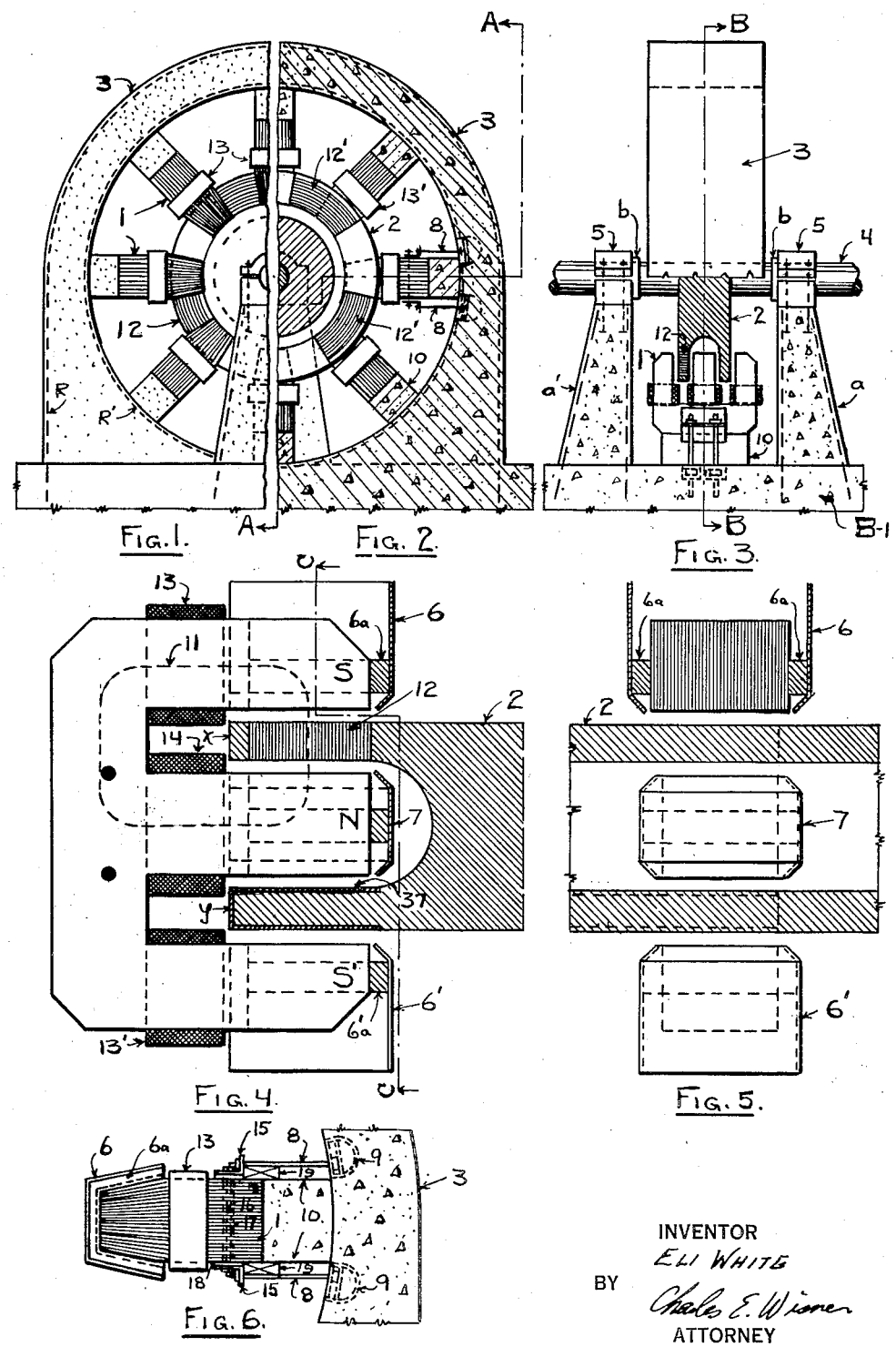
INVENTOR
ELI WHITE
BY
Charles E. Wisner
ATTORNEY Nov. 28, 1933.  E. WHITE  1,937,213
MAGNETIC INDUCTION MACHINE
Filed Oct. 24, 1931  5 Sheets-Sheet 2

INVENTOR
ELI WHITE
BY
Charles E. Wisner
ATTORNEY

Nov. 28, 1933.  E. WHITE  1,937,213

MAGNETIC INDUCTION MACHINE

Filed Oct. 24, 1931    5 Sheets-Sheet 3

INVENTOR
ELI WHITE
BY
Charles E. Wiener
ATTORNEY

Patented Nov. 28, 1933

1,937,213

UNITED STATES PATENT OFFICE 1,937,213

MAGNETIC INDUCTION MACHINE

Eli White, Detroit, Mich.

Application October 24, 1931. Serial No. 570,938

26 Claims. (Cl. 171—252)

This invention relates to magnetic induction machines of a character that may be operated either as a direct current generator, motor, or motor generator, and a feature of the invention is in the provision of such a machine having no coils on the moving parts and is similar in some respects to the invention disclosed in my Letters Patent of the United States, No. 1,890,104.

One of the principal objects of the invention is to provide a machine for generating direct electric current of high voltage.

Heretofore, machines for generating direct current have been limited to production of current of about one thousand volts and by my invention I am able to produce a magnetic induction machine in which the voltage is greatly increased, being limited only by the insulation on the coils and/or the voltage limit of an electronic valve utilized in directing current flow as hereinafter more fully described.

It is further a feature and object of the invention to provide a direct current generator having no commutator or brushes.

Another object of the invention is to provide a direct current generator utilizing an electronic valve or electronic valves whereby current may only flow in the generating coils in a direction to add to the magneto-motive force of the field coils thereby reducing the $I^2R$ losses for field excitation.

It is further an object of this invention to provide a machine constructed to operate as a direct current motor in which the current is successively directed to proper magnetic coils by means of the potential control of the grid of an electronic valve. This control is accomplished by means of stationary brushes and a commutator revolving with the rotor whereby only a very light or low voltage current passes through the commutator and brushes, and this current passing to the grids of electronic valves directs surges of heavy amperage and high voltage at proper intervals to the magnetic coils which actuate the rotor by drawing the segments of magnetic material of which the rotor is constructed successively opposite the stator pole pieces magnetized by said current surges. By this arrangement the sparking that would otherwise make it impossible to directly handle high voltage current by the commutator is avoided.

An additional object of the invention is to provide a magnetic induction machine operable as a motor generator so constructed that the direct current supply may be increased or decreased in voltage. This is accomplished by using two sets of coils on the pole pieces or arms of the machine, one set herein termed "surge coils", being used to operate a rotor composed of alternate segments of magnetic and non-magnetic material so arranged as to permit surges of magnetic flux to cut through the second set of generator coils immediately adjacent to or wound with the surge coils, the induced current generated by the said second set of generator coils being passed through an electronic valve to produce direct current.

Another object and feature of the invention is to provide a non-magnetic framework such as reinforced concrete to support the rotor and the surge units.

An additional object of the invention is to provide a rotary magnetic induction machine in which a stator having a series of radially arranged surge units is employed in conjunction with a rotor having a series of alternate magnetic and non-magnetic segments passing successively into and out of the respective surge units in which the magnetic pull is in a direction parallel with the axis of the rotor and in which radial pull is absent, thereby enabling the machine to be used with one surge unit without unbalancing the rotor. By this arrangement a machine is provided whereby in placing one or more surge units in circuit the output may be varied as may be required by the current demand in successive time periods.

Another object of this invention is to make use of a condenser and electronic valves in a rotary magnetic induction generator or motor having an electro-magnetic stator and rotor with alternate segments of magnetic and non-magnetic material, so that the condenser can store up in a very short interval of time, corresponding to approximately ½ of a single frequency, an electric charge generated in the surge coil of an outgoing segment and then by means of an electronic valve, transfer this charge back into the surge coil of an incoming segment, instead of discharging it back through the coil in which the charge was generated.

In the case of a generator, part of the electrical energy generated in a surge coil of an outgoing segment is thus transferred back to build up the stored energy in the space between the incoming magnetic segment and the stator unit whereby the energy producing capacity of the generator is greatly increased.

Likewise in the case of a motor, the counter electromotive force, which would be generated in the surge coil of an outgoing segment and which would cause a drag on the outgoing segment, is transferred to the surge coil of an incoming segment, thereby increasing the pull on the incoming segment to balance the drag on the outgoing segment and thereby adding greatly to the mechanical energy which the motor can produce. This is more clearly explained hereinafter in a mathematical demonstration as to the theory governing this type of induction machine.

These general objects and various other objects and novel features of the invention are hereinafter more fully set forth and described, and the preferred form of construction of a rotary magnetic induction machine embodying my invention is shown in the accompanying drawings in which—

Fig. 1 is a half end view of my improved induction machine.

Fig. 2 is a half cross section taken on line B—B of Fig. 3 positioned in approximately correct relation and close association with Fig. 1 being separated therefrom by an irregular line.

Fig. 3 is part section and part elevation taken on line A—A of Fig. 2 showing the alternate arrangement of the magnetic and non-magnetic material of which the rotor is formed.

Fig. 4 is an enlarged detail of a surge unit including a portion of the rotor showing magnetic shields supported on the pole arms by non-magnetic material.

Fig. 5 is a section partly in elevation taken on line C—C of Fig. 4.

Fig. 6 is an enlarged detail showing the method of securing surge units to the concrete frame or ring.

Figure 7:
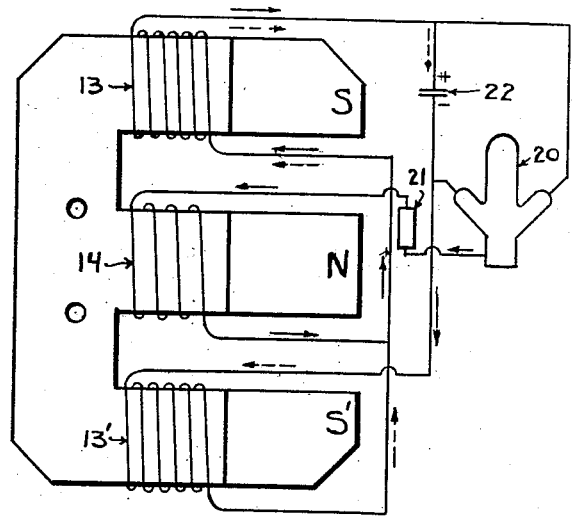

Fig. 7 is a wiring diagram showing my improved rotary induction machine used as a direct current generator in which for convenience the center pole arm is shown as a north pole and the two outside pole or surge arms are indicated as south poles. This diagram also illustrates the arrangement of an electronic valve, such as a mercury arc rectifier, and a condenser connected in the circuit. This diagram represents the condition of the circuit when a magnetic motor segment is moving out from the pole arms N and S and the potential developed in the coil of the pole S is increasing.

Figure 8:
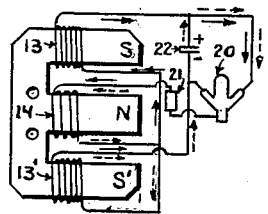

Fig. 8 is a wiring diagram showing the condition of the circuit when the potential in the coil on the pole arm S is less than the potential in the condenser whereby the condenser is then feeding current back into the circuit instead of storing it.

Figure 9:
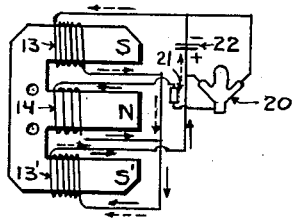

Fig. 9 is a similar wiring diagram one-half cycle later than is the condition shown in Fig. 7 in which the potential in the condenser is reversed from the condition shown in Fig. 7.

Figure 10:
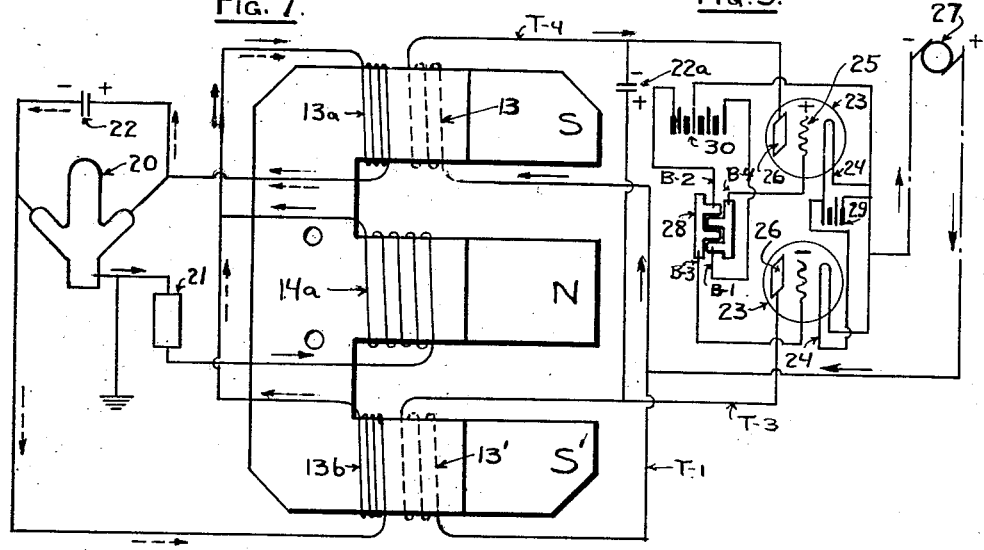

Fig. 10 is a wiring diagram showing the connections and parts required when the induction machine is used as a motor generator.

Figures 11, 12:
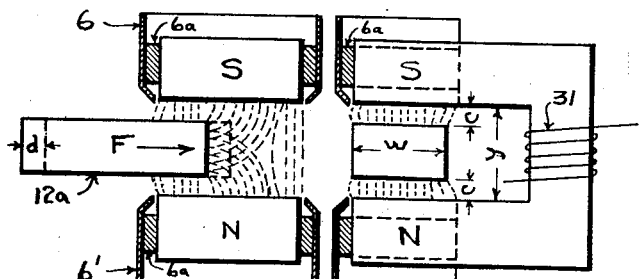

Fig. 11 is a diagrammatic illustration of the lines of force developed on the rotor segments by magnetic flux passing between pole faces N and S.

Fig. 12 is a similar diagram in side view of Fig. 11.

Figures 13, 14:
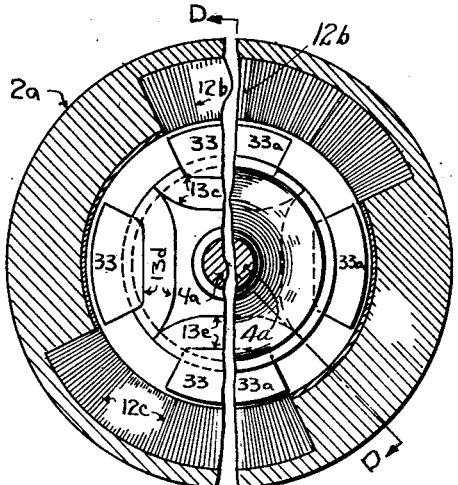
Figure 15:
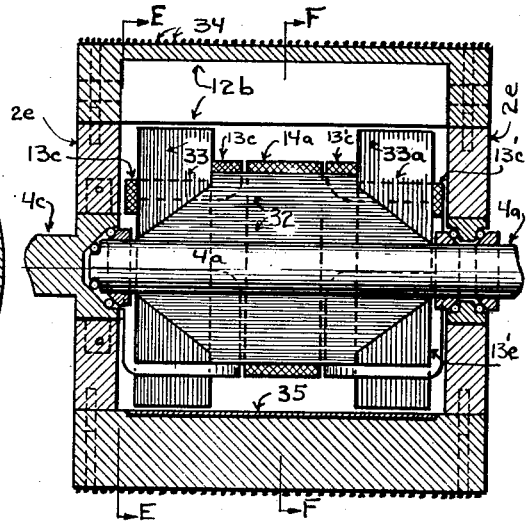

Fig. 13 is a half cross-section of a form of my rotary induction machine taken on line E—E of Fig. 15 in which only two magnetic rotor segments are provided in the circumference of the rotor which is a form adapted for higher speed than the form shown in Figs. 1 to 3 previously described.

Fig. 14 is a half cross-section taken on line F—F of Fig. 15 and in its correct relationship with the parts shown thereof in the adjacent section Fig. 13 and being separated therefrom by a broken line.

Fig. 15 is a longitudinal center section of the machine illustrated by the combined Figs. 13 and 14.

Figure 16:
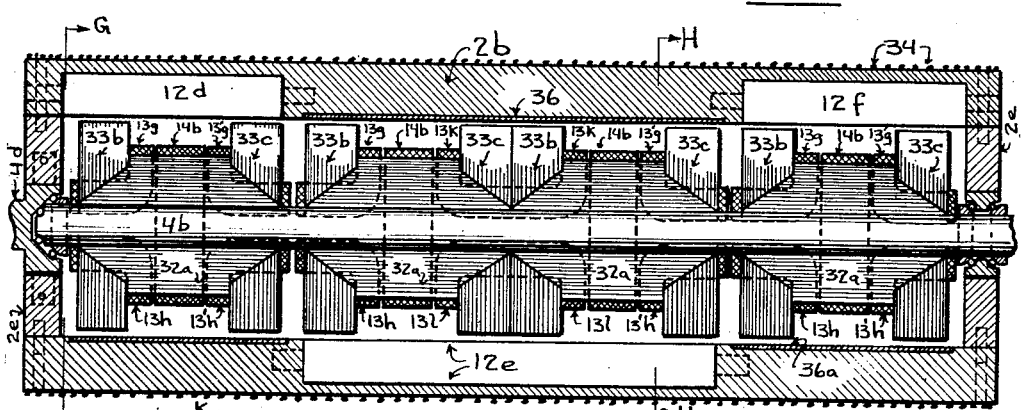
Figures 17, 18:
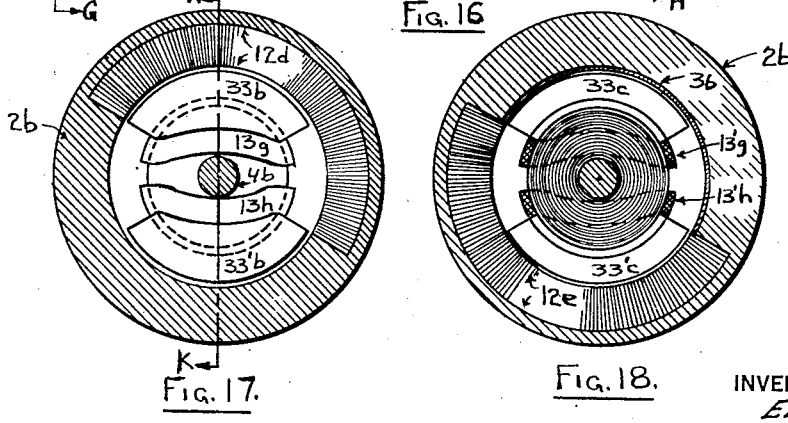

Fig. 16 is a section taken on line K—K of Fig. 17 showing a series of surge units forming the stator.

Fig. 17 is a section taken on line G—G of Fig. 16.

Fig. 18 is a section taken on line H—H of Fig. 16.

Figure 19:
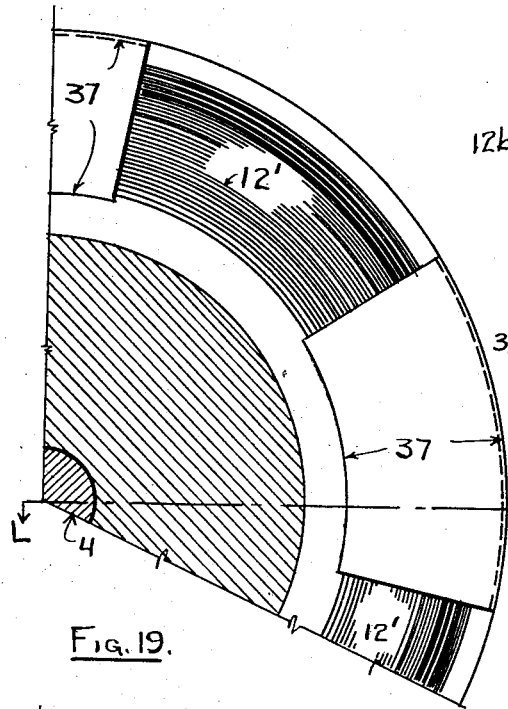

Fig. 19 is an enlarged section of a segment of the rotor taken on line B—B of Fig. 3.

Figure 20:
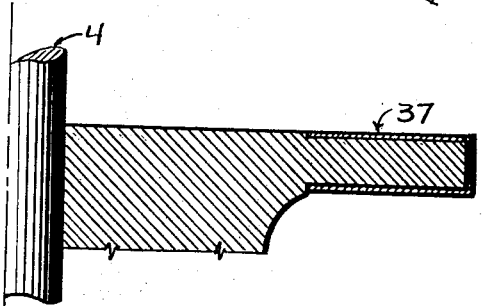

Fig. 20 is a section taken on line L—L of Fig. 19.

Figure 21:
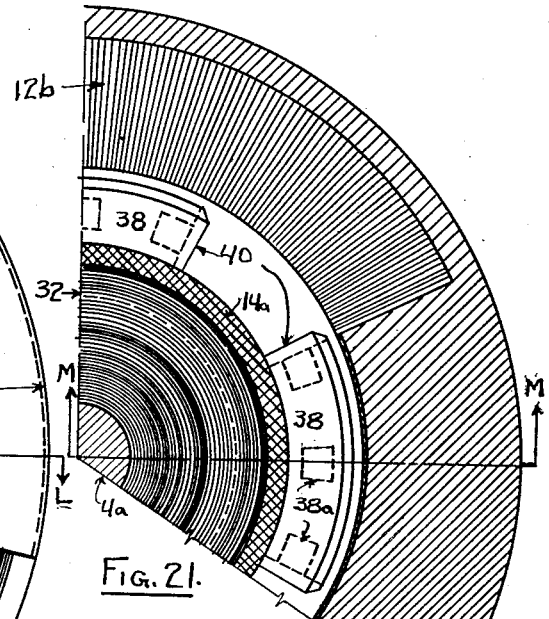

Fig. 21 is an enlarged section taken on line F—F of Fig. 15.

Figure 22:
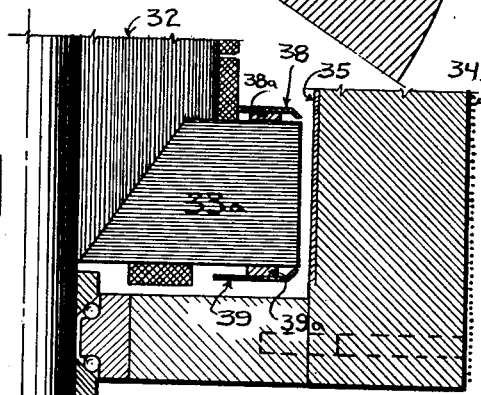

Fig. 22 is a section taken on line M—M of Fig. 21.

Figure 23:
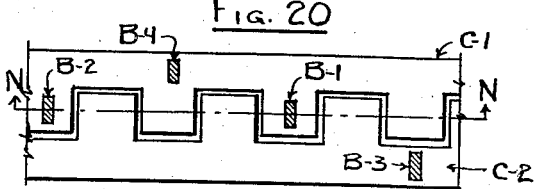

Fig. 23 is a developed view of the commutator structure employed with my rotary induction machine when used as a motor or motor generator.

Figure 24:
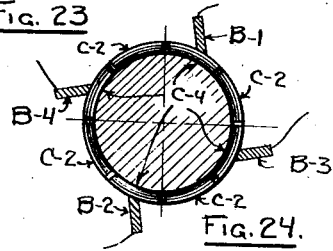

Fig. 24 is a sectional view showing the commutator parts in their relative relationship taken on line N—N of the developed view Fig. 23.

Figure 25:
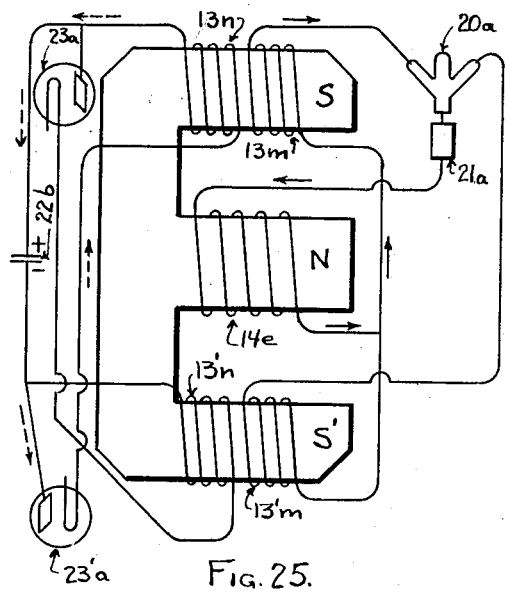

Fig. 25 is a wiring diagram showing the condenser circuit operating through separate surge coils wound on the same pole arms as generating coils also showing the electronic valves used in connection with same.

Figure 26:
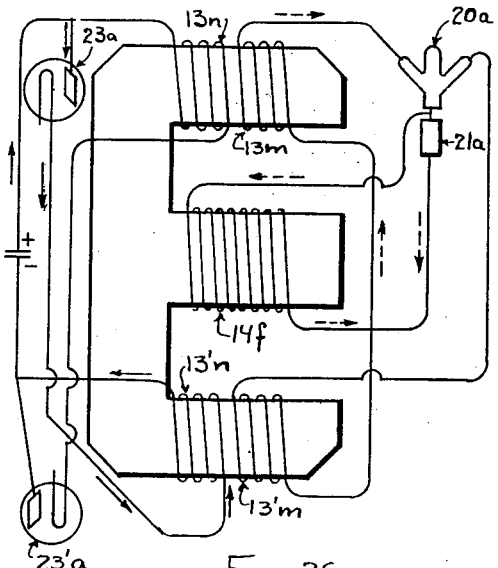

Fig. 26 is a similar wiring diagram showing a field coil connected in shunt with the load and the condenser discharging back to an opposite surge coil.

Figure 27:
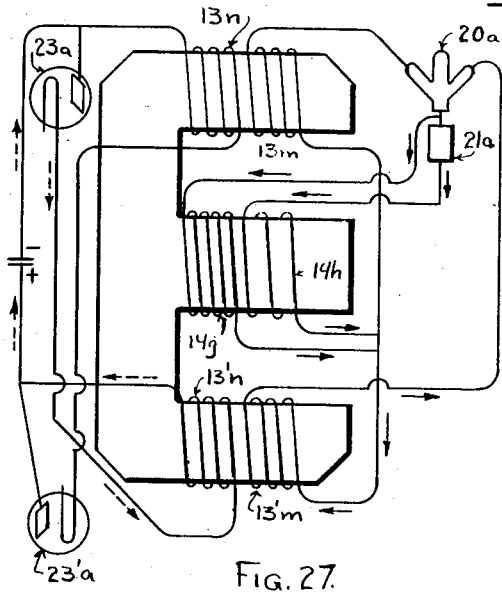

Fig. 27 is a similar diagram showing two field coils, one connected in shunt with the load and the other in series with the load.

The general construction of my improved rotary magnetic induction machine will be understood from Figs. 1, 2, 3 and 4. In these figures the base of the machine B—1, the uprights $a$ and $a'$ and the stator ring 3 are of non-magnetic material preferably reinforced concrete which it is possible to use in a machine constructed according to my invention, in that iron is not required in the stator ring and therefore may be made of non-magnetic material, thus lessening the cost. The ring is reinforced with reinforcing rods R and R'. The standards $a$, $a'$ have metal bearings 5 to support the rotor shaft 4, the rotor being mounted on this shaft intermediate the bearings. The stator is provided with a series of surge units 1 arranged in a circle and projecting radially inward from the stator ring 3. These surge units are illustrated in Fig. 6 wherein it will be seen that the stator 3 has bolts 8, 8 supported in the ring by means of the inserts 9, 9. These bolts carry at their outer ends the angle members 15 on opposite sides thereof and bolts 16 pass between these members through an aperture provided in the metal base of the surge units and insulated therefrom by means of an insulating sleeve 17. Insulating plates 18 separate the angles from the surge unit which is preferably laminated in form and wedges 19 formed of insulating material are driven to position between the bolts 8, surge unit 1 and concrete block 10 which is positioned between the base of the surge unit and the stator ring and is removable from such position.

By loosening the nuts of the bolts 8 and the wedge members 19 the concrete block 10 is removable permitting the surge unit after removal of the bolt 16 to be moved radially outward toward the stator ring 3 and thence axially of the machine to permit repair of the surge unit as for instance for a short-circuiting of the coil 13 mounted thereon. It is one of the features of this invention to provide a construction in which the surge units may be independently removed without disturbing or disassembling in any of the other parts in the machine. The surge unit is shown on an enlarged scale in Fig. 4 from which it will be observed that the unit is E shaped, is formed of laminated sheet metal and has a center pole arm N and the end pole arms S and S' in spaced parallel relation therewith. A field coil 14 is positioned on the center pole arm which is shown as a north pole and by passing electric current through the field coil a magnetic flux will be created having two circuits or paths, one passing upward through pole S as indicated at 11 and the other passing downward through the pole S' and the proportion of the flux passing through these circuits will depend upon the character of material occupying the space between the pole arms N and S and pole arms N and S' respectively. The rotor 2 is formed of non-magnetic and non-conducting material in which are embedded segments 12 and 12' of magnetic material.

It will be noted that the rotor has two peripheral flanges in the plane of rotation, the flanges lying respectively in the two spaces between the pole arms N, S on the one side and N and S' on the other. Each of these flanges carry the magnetic segments and non-magnetic portions in succession that pass by rotation of the rotor between the respective pole arms. It will be further observed that the magnetic segments of one of the flanges as X is opposite a non-magnetic portion Y of the other flange. From this arrangement it will be noted that when one of these segments as 12 in Fig. 4, comes between the two pole pieces N and S, the space between the opposite pole faces N and S' is occupied by the non-magnetic portion of the opposite flange Y. In this position of the rotor a larger part of the magnetic flux generated by the electric current in the coil 14 will pass through the path 11. As the rotor is rotated and a magnetic segment 12' shown in Fig. 2 in the rotor flange Y comes between the pole faces N and S' the larger part of the magnetic flux will pass downward to the pole face S' forming a magnetic circuit through the pole N and S' similar in form to that shown at 11 in the same figure between the pole pieces N and S. It will therefore be seen that continuous rotation of the rotor will cause alternate surges of the magnetic flux in the pole arms S and S'. If the surge coils 13 on the pole S and 13' on the pole piece S' be connected in a circuit, alternating current of electricity will be induced by alternately increasing and decreasing fluxes of magnetism which cut through these coils.

It is desirable to concentrate the flux into an area approximately equal to the area of each pole face and for this purpose magnetic shields 6 on the pole S and 6' on the pole piece S' are used. These are made of thin sheets of magnetically permeable material such as soft iron or silicon steel and are separated from the body of the respective pole arms by blocks of non-conducting material as indicated at 6a in Fig. 4. By this means it is possible to reduce the magnetic leakage through the open circuit of the surge unit and thereby increase the difference between the total flux passing through a surge arm in the open and closed condition of the magnetic circuit and thus to increase the surge of the magnetic flux with corresponding increase in the induced current in the surge coils 13 and 13'.

I also utilize magnetic shields on the non-magnetic portions of the flanges X and Y of the rotor 2 as indicated at 37 in Fig. 4 which are formed of single sheets of magnetic permeable material. These sheets are quite thin and serve to greatly reduce the flux from one pole piece to another between which it is located. The function of the shield on the rotor is to provide a path which a considerable number of lines of force will take rather than pass directly from one pole to the other and this appears to greatly reduce the tendency of the major portion of the lines of force passing from pole N to S' for instance between which this shield and intervening non-magnetic portion of the flange is positioned.

The shield therefore tends to increase the difference between the total flux passing through a surge arm in the open and closed condition of the magnetic circuit with a corresponding increase in volume of current induced in the surge coils.

It is a well known principle that an electric current induced in a closed coil by an increasing or decreasing magnetic flux flows in such direction as to oppose the change in flux. In case the rotor section is moving out from between its pole pieces N and S, the magnetic flux in the circuit will be decreasing and the current induced in the surge coil 13 will tend to oppose this decrease and will thereby tend to add to the magneto-motive force of the field coil. Further, as the segment 12' moves into position between the pole pieces N and S' the magnetic flux in this circuit will be increasing and the current of the surge coil 13' will tend to oppose the flux and thereby tend to reduce the magneto-motive force of the field coil. It will therefore be noted that if we can permit current to be generated in the surge coil when the rotor segment is passing out between two pole faces and at the same instant have the surge coil for the incoming rotor segment on open circuit the generating capacity of the machine will be increased in two ways.

Firstly, the magneto-motive force of the generating coil will add to that produced by the field coil and secondly, the total flux passing through the increasing magnetic circuit will be increased as no counter electro-motive force is induced in the surge coil of the incoming segment to oppose the increase of the flux.

This condition of the parts can be ideally obtained with an electronic valve such for instance as a mercury arc rectifier or Kenotron tube by connecting the same to the surge coils in such manner as to permit current to pass in a surge coil when a magnetic rotor segment is moving out from between pole faces and vice versa to prevent current flow when a magnetic rotor segment is moving in between the pole faces.

The method of connecting such an electronic valve in the circuit of the surge coils when the rotary magnetic induction machine is used as a generator is shown in Fig. 7. In this diagram it is assumed that the magnetic rotor segment is passing out from between pole pieces N and S and the full line arrows indicate the path of current generated in the surge coil 13. It will be seen that, after leaving the surge coil, the current passes through the anode of an electronic valve 20 thence to the cathode and thence through the load which is indicated at 21 and finally through the field coil 14 connected in series with the generating circuit. It will be noted that any increase of current generated causes an increased magneto-motive force in the magnetic circuit indicated at 11 in Fig. 4 with an increased flux and a corresponding reactance in the coil 14 which tends to oppose increase in current and that any decrease in current generated will be resisted by the same reactance tending to smooth out irregularities in the voltage curve of the generated current.

In Fig. 7 a condenser is indicated at 22. This is a vital and important feature of the invention. The efficiency of this condenser in increasing the amount of current produced by the generator depends on adjusting its capacity to the surge coil with which it is being used and if too great capacity is employed it will reduce the amount of current being generated. If a condenser of too small capacity be used there will be little advantage gained but when a condenser of the proper capacity is used it will more than double the output of the generator for a given speed as compared with the power of the generator if the condenser were not used. In Fig. 7 the dotted arrows indicate flow of current connected with the charging of the condenser. Fig. 7 illustrates the condition of the generated current and the charging current for the condenser at the time the voltage generated in the surge coil of the outgoing segment is increasing. It will be observed from this figure and the dotted arrows that the charging circuit for the condenser is only through the two surge coils terminating in the respective plates of the condenser. Under this condition of parts, as the voltage increases in the coil 13 the plus and minus charges on the plates of the condenser will increase and continue to increase until the voltage generated in the surge coil has reached the maximum value.

It is also to be observed that the circuit indicated by the dotted arrows passing through the condenser does not in this described case pass through either the electronic tube, the load or the field coil and it will also be noted that current generated on the surge coil 13 is divided into two parts, that represented by the full line arrows which performs work when passing through the load and the other represented by dotted line arrows which delivers positive charge to the plate of the condenser and further it is to be noted that an equal current represented by dotted arrows is at the same instant generated on the coil 13' delivering negative charge to the opposite plate of the condenser. The potential between the plates of the condenser therefore will be approximately double the potential generated by a surge coil 13 and thereby doubling the quantity of current which a given capacity condenser can store. An important feature of this arrangement is that the current generated in the surge coil 13' in the case described opposes a flux that would be produced by incoming magnetic segment between the poles N and S' and consequently the magneto-motive force caused by current in the coil 13' and the dotted arrow circuit opposes and neutralizes the magneto-motive force generated by the dotted arrow circuit in the coil 13. Hence, this last named current is not opposed by the reactance of the magnetic circuit as is the case with the current indicated by full line arrows in Fig. 7.

When a magnetic segment is passing from between poles N and S and has reached such position that the voltage generated in the coil 13 has reached a maximum and starts to decrease the condition which arises in the circuit is represented in Fig. 8. The condenser 22 begins to discharge through the path of the least counter E. M. F. which is indicated by dotted arrows in Fig. 8 and now shows the circuit indicated by the dotted line arrows passing through the electronic valve, the load and the field coil. After passing the field coil the current from the condenser passes back to the surge coil 13' and as the quantity of the current stored by the condenser is practically double that produced by the dotted arrow circuit of Fig. 7 in either surge coil, more magnetic flux passes into the circuit of the incoming magnetic segment passing into the space between the pole arms N and S' than is taken out of the outgoing segment between the pole pieces N and S in charging the condenser. The current represented by the full line arrows of Fig. 8 continues back into the coil 13 and during this period of the cycle magneto-motive force will be added on both surge coils and the field coil and the sum of the magneto-motive force on the combined magnetic circuits will attain a maximum and the algebraic sum of the reactances in the two magnetic circuits will become a maximum with corresponding retarding effect on the current passing through the coils.

The next period of the cycle is represented in Fig. 9 when the condenser has been discharged and the magnetic segment is moving out from between the poles N and S' and current is being generated in the surge coil 13' part of which as represented by the dotted arrow circuit is recharging the condenser with opposite potential while the balance is passing through the electronic valve 20 performing useful work in the load 21. At this period, as is the case of the part of the cycle shown in Fig. 7, the magneto-motive force of the dotted arrow circuit on the two surge coils neutralizes each other and the magneto-motive force of the full line arrow circuit is much less than the combined magneto-motive force in the condition represented by Fig. 8. During this portion of the cycle of Fig. 9 the magneto-motive force on the pole arm N falls to a minimum. Therefore, the reactance of the magnetic circuit tends to generate current in the field coil which adds to the full line arrow circuit. This same condition occurs in the portion of the cycle illustrated by Fig. 7 but was not mentioned in the description of the circuits for that figure because we had not given a description of the preceding condition in that cycle.

It will be seen from the above that the combined reactance of the three coils and the use of an electronic valve and the condenser of proper capacity works effectively for the production in the generating circuit of a uniform direct current voltage. With this understanding of the surge units and the use of electronic valve and condenser in relation thereto, the operation of the machine when used as a generator will be more clearly understood. In Figs. 1, 2 and 3 it will be noted that the machine is provided with eight surge units so arranged that alternate units are at half cycle in their generating position with the preceding unit. This means that surge coil 13 of one unit will be in phase with surge coil 13' of the next unit hence these coils of the same phase may be connected in parallel or in series as may be desired before being connected to the rectifier.

It has previously been mentioned that the several units are held in position in a concrete stator ring and are of such construction and arrangement, previously described relative to Fig. 6, as to permit removal or replacement of any surge unit without disturbing the rotor. The shaft is shown as supported in pillow blocks or bearings provided at the upper ends of the supports $a$ and $a'$, it being understood that suitable thrust collars $b$ are provided on the shaft as the magnetic forces tend to produce longitudinal strain on the rotor, that is, strains parallel with the axis of the shaft rather than radial strains.

As the strains are parallel with the axis of rotation and not radial there is no unbalancing effect on the rotor and the machine may be used with one or more units and in case of light loads only one or a part of the surge units need be used and in case of a heavy load all the units could be connected into service. Thus, in a single machine which has a light demand for current part of the day and a heavy demand at other periods, the machine can readily be arranged to cut into service any number of units as current demand may require.

With a condenser connected as shown in Figs. 7, 8 and 9, one disadvantage appears—namely, that current for charging the condenser is generated on both surge coils of the outgoing and incoming magnetic segments of the rotor. The current generated on the surge coil of the incoming segment and which is stored in the condenser must flow back through this coil in order to produce in the pole arm of the incoming segment the flux which normally would have been produced from the magneto-motive force of the field coil. By use of a separate circuit for the condenser involving separate surge coils and two electronic valves, as shown in Figs. 25, 26 and 27, it is possible to avoid the above mentioned condition. The dotted line arrows in Fig. 25 indicate the charging current generated in the condenser circuit by the surge coil of the outgoing magnetic segment.

It will be noted that while electronic valve $23'a$ permits electric charge to be removed by the potential in the surge coil $13n$ from the negative side of the condenser and transferred to the positive side of the condenser, the electronic valve $23a$ prevents the potential in the surge coil $13'n$ of the incoming segment to perform the same function. On the other hand, when the potential generated in surge coil $13m$ has attained a maximum and starts to decrease as is the condition illustrated in Fig. 26, the charge from the condenser then passes through the electronic valve $23a$ and through the condenser surge coil $13'n$ so as to transfer to the air gap of the incoming segment the energy stored in the condenser.

Fig. 27 shows dotted line arrows with the surge coil $13'n$ charging the condenser with the opposite potential when this surge coil is generating current from the movement of an outgoing rotor segment. Fig. 26 also indicates how the field coil $14f$ may be connected in shunt with the load. In this case the field coil will in general have a large number of turns of fine wires similar to the shunt wound coils used with ordinary dynamos. Fig. 27 indicates how both a series and a shunt coil can be used on the field arm forming what is known as a compound winding.

The above description, covering the use of a separate surge coil for the condenser circuit, is equally efficient when my induction machine is used as a motor.

Figs. 13 to 18 inclusive show details of the form of my rotary magnetic induction machine adapted for higher speeds than the form shown in Figs. 1 to 3 and also the advantage of combining in one body a field magnet for two sets of generating surge units whereby the amount of wire and the $I^2R$ losses on the field coil are considerably reduced. In this form of my invention the center or field portion 32 is made of laminated steel as previously described. Adjoining this, fitting closely thereon, are pole arms 33 and $33a$ formed of disk like laminations and a magnetic circuit for these pole arms is completed by the rotor segments $12b$ and $12c$. The surge coils $13c$ and $13'c$ for these pole arms are wound across the outer transverse base of the disk laminations of the respective pole arms thence longitudinally across the edges of the pole arms and then circumferentially around the sector of the cylindrical field body. Between these portions on the circumference of the field body is provided the field coil $14a$ as shown in Fig. 15. In this machine the shaft $4a$ and its attached laminated field surge arm, field coils and surge coils remain stationary and the rotor $2a$ rotates about the same. The rotor is composed of a non-magnetic and non-conducting material having magnetic segments $12b$ and $12c$ embedded therein and in case of high speed the rotor may be wound on its circumference with high tension wire 34 to resist centrifugal forces.

In this case, as in the character of construction shown in Figs. 1, 2 and 3, it is possible to perfectly balance the rotor and operate the same at comparatively high speeds with little windage loss and as the generated current is being rectified the device is not limited in speed to any definite number of cycles per second and the speed may be varied to obtain higher or lower voltages. With the type of construction shown in Figs. 13 to 17 the rotor $2a$ which is formed of a cylindrical casing, may be entirely filled with oil assisting to reduce the heat losses and increasing the dielectric strength of the insulation on the coils. In such case (although not here shown) means should be provided to prevent leakage through the shaft bearings.

It is further to be noted that, in the construction Figs. 13 to 18, the end section $2e$ of the rotor may be made removable to permit insertion of the stator section. The shields for this type of machine are shown in Figs. 21 and 22 and are particularly efficient in this design as the shields 38, 39 and 40 concentrate the magnetic flux on the pole faces of the surge arms 33 and $33a$ and when the non-magnetic segment of the rotor is opposite the pole faces the magnetic flux is still further confined and retarded by the shields 35 which revolve with and are attached to the rotor. In this construction also the shaft may be made hollow and the terminals for the surge and field coils brought out through the center of the shaft as will be readily understood (not here shown).

In Figs. 16, 17 and 18, is shown in detail, the machine as adapted to very high speeds compared to that attained by a steam or a mercury turbine and these figures further illustrate how several stator units may be assembled on the shaft which arrangement is also equally applicable to the design shown in Figs. 1, 2, 3, 13 and 14.

In the construction shown in the said Figs. 16, 17 and 18 there are only two surge poles $33b$ and 33'b on the circumference of the surge unit. In order to obtain proper balancing on the rotor with the heavy segments of magnetic material the segments are so arranged that two of them 12d and 12f are on one side of the rotor while the corresponding segments for the other two units are combined into one segment 12e and in this construction the shaft with its attached laminated field, surge arms, field coils and surge coils remain stationary while the rotor 2b revolves about it. The operation of the device constructed according to Figs. 16, 17 and 18 is similar to that of the device shown in Figs. 13, 14 and 15 except there is only one magnetic rotor segment 12d in a circumference instead of two and consequently there is only one cycle of current generated in each revolution thereof instead of two. The wiring diagram connection of the surge coils, field coil, electronic valve, load and condenser are similar to that previously illustrated in Figs. 7 to 10 inclusive and 25 to 27 inclusive.

It is to be noted that the surge arms 33c and 33b are placed in immediate contact with each other so that one surge coil 13k is sufficient for both. By this arrangement a considerable saving of conducting wire is secured over previously illustrated construction as less wire is required in proportion to the current generated.

Previous description of the wiring diagrams as described relate particularly to the use of my improved rotary magnetic induction machine as a generator. It, however, can just as readily be used as a direct current motor and with equal efficiency. When thus used it is necessary to employ a commutator for directing current to the proper surge coils. Details of such commutator are indicated in Figs. 23 and 24. The commutator is secured to the rotor shaft and rotates therewith but the brushes remain stationary. While the current used in the surge coils may actually pass through the commutator, the commutator may be used as shown in the wiring diagram Fig. 10 to direct the light control current to the grid of the electronic valve 23. When the commutator is used to carry the current that passes through the surge coils only three brushes B—1, B—3 and B—4 are needed. One terminal or source of electrical energy would be connected to the center wire T—1 connecting the two surge coils and the outer or free terminals T—4 and T—3 of the surge coils would be connected to the brushes B4 and B3. Another terminal of the supply circuit would be connected to the brush B1.

The condenser 22a is connected across the outside terminals of the surge coils as shown. By this means surges of electric current are sent to alternate surge coils thereby pulling the successive magnetic segments of the rotor into position between the magnetic pole pieces. The movement of the rotor brings successive commutator segments of the rings C1 and C2 at the proper time intervals under the brushes to cause continuous revolution of the rotor.

At the right side of Fig. 10 is shown a wiring diagram of a rotary magnetic induction machine used as a motor with a commutator directing a light grid bias current which, by means of the electronic valves, directs a heavier and higher voltage current to successive surge coils so as to cause revolution of the rotor in the same manner as previously described. This diagram shows a unit at the instant when a magnetic rotor segment is being drawn in position between the pole pieces N and S. The condenser 22 is connected across the outer terminals of the surge coils in the same manner as shown in the wiring diagram for the generator Fig. 7 and performs the same function of storing an electric current during the interval when the same is being shifted from one surge coil to the other. On the inner ends of the surge arms shown in the wiring diagram Fig. 10 are indicated the generating surge coils 13a and 13b.

If these generating surge coils 13a and 13b are connected in circuit with the load 21 and the electronic valve 20 having the condenser 22 connected across anodes, the magnetic flux from the motor coil 13 in passing through the pole arm S will cut the convolutions of the coil 13a thus inducing the current therein to oppose the increase of flux, the direction of current flow being shown by the full line arrow. The voltage generated on coil 13a will be directly proportional to the voltage applied to coil 13 and to the ratio of turns in coil 13a to the turns in coil 13. Currents thus induced in the surge coils 13a and 13b are connected in circuit with the field coils 14a, load 21, electronic valve 20 with the condenser 22 connecting across the anodes as previously described for the generator whereby a comparatively uniform voltage direct current is produced. When comparatively heavy current is drawn from the generator side of the motor generator the speed of the rotor will be reduced. On the other hand, when light current is being taken from the generator side the speed of the rotor will be increased until the counter E. M. F. in the surge coils approximately equals the voltage impressed on the motor.

By means of the design of the motor generator as above described, it is possible to step up or step down direct current from one voltage to another and since these currents do not pass through the brushes or commutator they may be of any voltage that can be resisted by the insulation of the coils or that can be handled by the electronic valve.

If a motor of heavy torque and slow speed is required, the former arrangements of the surge units shown in Figs. 1, 2 and 3 are utilizable, it being understood that the diameter of the rotor may be greatly increased thereby using many more segments than are shown in said figures and thereby greatly increasing the torque.

In order to explain more fully the advantages and possibilities of my invention, a brief description will now be given covering the theory involved in the design of my rotary magnetic induction machine. In Figs. 11 and 12 are shown an electromagnet with pole arms N and S, a coil 31 is shown for energizing the magnet and a magnetic rotor segment 12a is shown entering between the pole faces of the magnet. Magnetic shields 6 and 6' are shown attached to the pole arms of the magnet. The magnetic flux between the pole faces and the rotor segment are indicated by dotted lines. Dashed lines show the position of the rotor after it has moved a distance "d" to the right thus entering further in between pole faces N and S. The clear distance between the pole faces and the face of the rotor segment is shown as "c" (to be measured in inches). The width of the rotor segment is shown as "w" (to be measured in inches).

For this demonstration, we will assume the intensity of flux in space "c" to be 100,000 lines of force per square inch. Disregarding the magneto-motive force required to pass this amount of flux through the rotor segment, the intensity of flux for distance "$y$" in space between pole faces N and S will be $$\frac{2c}{y} \times 100{,}000$$

lines per square inch.

The magnetic energy stored in a given volume of space due to a certain flux is given in standard works on magnetism as:— energy in ergs=

$$\frac{\text{(vol. in cu. cm.) (flux in lines per sq. cm.)}^2}{8\pi}$$

which reduced to ft. lbs., inch system becomes:— energy in ft. lbs.$=K.\ V.\ B.^2$, where $K$ is a constant equal to $$\frac{1}{865{,}300{,}000},$$

$V$ equals volume of space in cubic inches and $B$, equals flux in lines per sq. inch.

From the above formula by a consideration of Fig. 11, it will be noted that as the rotor segment 12a moves forward a distance "$d$", we have added between the pole faces and the rotor segment, stored energy equal to $$\frac{2cwd \times 100{,}000^2}{865{,}300{,}000} \text{ ft. lbs.}$$

and we have deducted from the stored energy in space $y$ between the faces of pole arms N and S energy equal to $$\frac{ywd\,(2c \times 100{,}000)^2}{y^2 \times 865{,}300{,}000} \text{ ft. lbs.}$$

The net additional energy stored by movement "$d$" of rotor segment 12a will then be equal to:—

$$\frac{100{,}000^2}{865{,}300{,}000}\left(2cwd - \frac{4c^2wd}{y}\right) = \frac{100{,}000^2 \cdot 2cwd}{865{,}300{,}000}\left(1 - \frac{2c}{y}\right) \text{ ft. lbs. (1)}$$

The additional flux passing through coil 31 due to this movement of the rotor segment will be:—

$$\text{additional flux} = 100{,}000\ wd\left(1 - \frac{2c}{y}\right) \quad (2)$$

We will assume that there are 1000 turns on coil 31, then the counter electro-motive force produced in this coil by the movement of rotor segment through distance "$d$" is given by the well known formula $$E = \frac{S d\phi}{dt\ 10^8}$$

where $S$ equals the number of turns on the coil$=1000$, $d\phi$ equals increase in $$\text{flux} = 100{,}000\ wd\left(1 - \frac{2c}{y}\right),$$

see Equation (2), and $dt$ equals increment of time which we will assume as one second. From the above, the counter electro-motive force $$E = \frac{1000 \times 100{,}000\ wd\left(1 - \frac{2c}{y}\right)}{100{,}000{,}000} = wd\left(1 - \frac{2c}{y}\right) \quad (3).$$

The ampere turns required in coil 31 to create a flux of 100,000 lines of force per square inch in two spaces "$c$", neglecting magnetic leakage and the magneto-motive force for the iron or steel portion of the circuit will be $$\frac{100{,}000 \times 2c}{3.19}$$

and the amperes required in the coil 31 which has 1000 turns will be $$\text{amperes} = \frac{200c}{3.19} \quad (4).$$

The input of electrical energy in watts is then equal to the product of the counter electromotive force by the amperes [see Equations (3) and (4)] or—

$$\text{Input in watt seconds} = wd\left(1 - \frac{2c}{y}\right) \times \frac{200c}{3.19} =$$

$$62.7\ cwd\left(1 - \frac{2c}{y}\right) \quad (5).$$

Referring to Equation (1) and reducing ft. lbs. to watt seconds we have, added energy stored in space for movement "$d$" of $$\text{rotor segment} = 31.35\ cwd\left(1 - \frac{2c}{y}\right) \text{ watt seconds (6)}.$$

This, it will be noted is just one-half of the electrical energy of input for movement $d$. The other half of the input is changed into mechanical energy represented by $Fd$ ft. lbs., where F is the average force in pounds developed by the movement of the rotor segment through distance $d$ in an increment of time of one second and $d$ is measured in feet instead of in inches as has been the case in the preceding formulas.

From the above equations we can now make three important deductions.

First, when electrical energy is imparted to the coil of an electromagnet having a magnetic segment centrally located between its pole faces and so arranged that it can move inwardly between said faces so as to increase the magnetic flux between said faces, the mechanical energy developed by such motion will equal the added energy stored in all of the flux space between the pole faces.

Second, under the above conditions, the mechanical energy developed in the motion of the magnetic segment plus the added magnetic energy stored in the flux between the pole faces will equal the total of electrical energy imparted to the coil of said electro-magnet for the period of such motion.

Third, if a magnetic segment is centrally located between the pole faces of an electro-magnet such that the flux passing through it and the electro-magnet is a maximum, the mechanical energy applied to remove said segment from its position will develop twice as much electrical energy in the coil of the magnet as the mechanical energy used in causing the removal. This is the converse of the second deduction.

By a consideration of Equation (5) it will be noted that the input in watts with "$w$" and "$d$" remaining constant, may be expressed as:—

$$\text{input } I = K\left(c - \frac{2c^2}{y}\right) \quad (7),$$

where $K$ is a constant depending on the total flux and dimensions "$w$" and "$d$". Now there will be some ratio of $$\frac{c}{y}$$

for which the input $I$ will be a maximum. Assuming $$\frac{c}{y} = x$$

and substituting in Equation (7) we have $$I = K(xy - 2x^2y) \quad (8).$$

Now differentiating with respect to $x$ we have $$dI = Ky(1-4x)dx \quad (9).$$

For a maximum value of input I, $$\frac{dI}{dx} = 0$$

and $$0 = Ky(1-4x) \quad (10)$$

or—

$$4x = 1 \text{ and } x = \tfrac{1}{4} \quad (11).$$

From this we see that the input of electrical energy for largest capacity as a motor and conversely output for largest capacity as a generator will occur when the ratio of $$\frac{c}{y} = \tfrac{1}{4} \quad (12).$$

Equation (12) shows that, with my type of rotary magnetic induction machine, increased capacity is obtained by using a clearance much larger than that used in the present usual types of motors and generators. In actual practice, it would not be economical to use a factor as high as $\tfrac{1}{4}$ as the $I^2R$ losses in the field would require that a somewhat smaller clearance be used, since the larger clearance $c = \tfrac{1}{4}y$ would require too much copper on the field coil.

With the special form of my type of field magnet and surge arms, when operated as a motor, the increment of stored energy which in the outward movement of a rotor segment are removed from the space between the poles of the outgoing segment are immediately transferred through the common magnetic circuit of the field, aided by the condenser, to be added to the stored energy between the opposite pole faces and the magnetic incoming segment, hence the entire amount of electrical energy input is efficient in producing all mechanical energy instead of 50 per cent stored magnetic energy and 50 per cent mechanical energy. Similarly, when operated as a generator there is no loss of mechanical energy being transformed into and stored as magnetic energy in space but it is all transformed into electrical energy.

It will be noted that in the designs of my induction machine as shown in Figs. 1 to 5 inclusive and 13 to 18 inclusive the length of both the magnetic and non-magnetic rotor segments measured in the direction of rotation are much greater than the length of the pole faces measured in the same direction. This is necessary with both the generator and motor and will now be explained on the basis of using the induction machine as a generator although the explanation is equally applicable to the machine when used as a motor. By a consideration of wiring diagram in Fig. 25, it is evident that the maximum voltage in coil $13n$ will occur at the instant when the rear end of a magnetic rotor segment is passing out and away from the far edges of the pole arms N and S. At this instant the charge in condenser $22b$ is a maximum and from this instant it will start to discharge electrical energy into coil $13'n$ as shown in Fig. 26. It will take a certain time interval for this condenser to discharge its energy into coil $13'n$ this interval being approximately equal to the time necessary to charge the condenser. This requires that there shall be sufficient length in the magnetic rotor segment passing between poles N and S' so that in its rotation it shall continue to provide a full magnetic path equal to the area of the pole faces until the condenser $22b$ has had time to transfer its electrical energy into stored magnetic energy between pole faces of arms N and S' and the incoming magnetic segment.

At the instant when the stored magnetic energy between poles N and S' is a maximum, the rear end of the magnetic rotor segment should start to move out from between these poles faces thereby reducing the path for magnetic flux between them and causing the generation of electric current in coils $13'n$ and $13'm$. This requires that the length of a rotor segment shall be approximately twice the length of the pole faces measured in the direction of rotation. The words "axially spaced" as used in the appended claims refer to the spacing of the companion surge pole arms or the two flanges of the rotor longitudinally of the axis of rotation of the rotor.

The advantages of my type of rotary magnetic induction machine when operated as direct current generator are as follows:

First, it has no coils on the moving parts, hence it is very simple to manufacture.

Second, the rotor being perfectly cylindrical in form can be designed for very high speeds with only a small windage loss.

Third, both the field and generating coils are stationary, hence there is no chafing of the insulation, due to centrifugal forces and in the type of design shown in Figs. 1, 2, 3 and 4, the coils can be form wound and can be easily slipped on or off the surge arms when it is desired to change the voltage or current generated by the machine.

Fourth, with the type of design shown in Figs. 1, 2, 3 and 4, since the magnetic forces between the stators and rotor are parallel to the shaft instead of radial, it is possible to vary the number of units which are used to correspond with the load.

Fifth, as no commutator is used, the only limit to the voltage of direct current which may be generated is the dielectric strength of the insulation on stationary coils, or the voltage limit of the electronic valves.

Sixth, with the form of machine shown in Figs. 13, 14, 15, 16, 17 and 18, all of the coils may be immersed in oil, thus greatly increasing the efficiency of their insulation and helping to disseminate heat losses.

Seventh, by the use of electronic valves it is possible to generate current during only that portion of the cycle when the generated current will add to the magneto-motive force of the field coil.

Eighth, by the use of a properly designed condenser connected as shown, it is possible to greatly increase the amount of electrical energy which can be produced by the machine and at the same time improve the uniformity of the generated voltage.

Ninth, by passing the generated current through the field coil, we gain the reactance value of that coil in improving the uniformity of the generated voltage.

Tenth, by increasing the clearance between the pole faces and the faces of the generating segments up to a maximum of $\tfrac{1}{4}$ of the distance between the pole faces, we greatly increase the generating capacity of the machine.

Eleventh, by the use of magnetic shields, both on the stator and rotor, it is possible to concentrate and increase the magnetic flux passing through a magnetic rotor segment and also to decrease the flux passing through a non-magnetic segment, thereby greatly increasing the electrical output of the machine.

Twelfth, the form of the design is such that the entire magnetic circuit is made up of laminated sheets of magnetic material so arranged that the magnetic flux is always parallel to the laminations thereby forming a most efficient magnetic circuit with low hysterisis loss.

The advantages of my type of machine when operated as a motor in addition to the advantages named above are as follows:

First, since there are no coils on the rotor, the number of magnetic segments on it and its diameter may be increased to any desirable, reasonable limit, thereby producing a slow speed, heavy torque, direct current motor, which is, under certain circumstances, very desirable.

Second, by the use of a grid bias control on an electronic valve it is possible to operate my machine as a motor with heavy and high voltage currents that could never successfully be handled by a commutator.

The advantages of my type of machine when operated as a motor generator are that it can efficiently step up or step down direct currents of any voltage that can be safely controlled by the insulation of stationary coils or that can be handled by the electronic valves.

Having thus fully described my invention, what I claim and desire to secure by Letters Patent of the United States is—

1. In a rotary magnetic induction machine, an electromagnetic unit comprising three pole arms, a field coil for magnetizing the center pole arm, generating coils encircling the other two pole arms on respective opposite sides thereof, a rotor having spaced peripheral flanges each flange having a series of segments of magnetic material alternating with segments of non-magnetic material of approximately equal size, the magnetic segments of one flange being opposite the non-magnetic segments of the other flange, the rotor being positioned with the flanges lying in the spaces between the center pole arm and the respective outer pole arms on opposite sides thereof, the arrangement providing a structure in which continued rotation of the rotor causes surges of magnetic lines of force alternating from one outside pole arm to the other outside pole arm and vice versa while the flux on the center pole arm remains practically constant thereby generating electric current in the generating coils of the outside pole arms.

2. In a rotary magnetic induction machine, a series of electro-magnetic units each having a central field pole arm and two axially spaced surge pole arms united at one end to each other and to the field pole by magnetic material, a field coil on the central pole arm, generating coils on the surge arms, magnetic shields on the extremities of each of said pole arms, a rotor having in two peripheral flanges a series of magnetic and non-magnetic segments in alternate relation, magnetic shields covering the non-magnetic segments, the rotor being so arranged that in rotation thereof one magnetic segment is positioned between the shielded pole face of the field arm and one surge arm while a non-magnetic segment and its magnetic shield are positioned between the opposite shielded pole face of the field arm and the corresponding shielded pole face of the other surge arm, whereby continued rotation of the rotor causes surge of magnetic lines of force alternately from one pole arm to the other and then from said other arm into the first in succession while the flux in the field arm remains practically constant, thereby generating electric current in said generating coils.

3. In a rotary magnetic induction machine, a stator comprising a number of electro-magnetic units composed of a stationary field body having a plurality of pairs of projecting pole arms in spaced relation, magnetic shields on each pole arm, a field coil on said field body for magnetizing the same, pairs of generating coils on said pairs of pole arms, and a rotor having alternate segments of magnetic and non-magnetic material of approximately equal size, a magnetic shield on each non-magnetic segment, rotation of the rotor causing the magnetic segments and the magnetically shielded non-magnetic segments to pass in succession between the pairs of pole arms to alternately permit and obstruct the passage of magnetic flux between the shielded pole faces and thereby generate electric current in said generating coils.

4. In a rotary magnetic induction machine comprising one or more electric-magnetic units, field coils, generating coils and a rotor having alternate segments of magnetic and non-magnetic material and magnetic shields as set forth in claim 2, the method or means for increasing the electrical generating capacity of the machine which consists in increasing the space between the faces of the magnetic segments of the rotor and the pole faces of the surge pole arms beyond that required for clearance in motion, the maximum width between the face of a magnetic rotor segment and an adjoining pole face measured in the direction of the flux not exceeding one-fourth of the clear distance between the adjacent or enclosing pole faces of the surge pole arms whereby the net total change of magnetic energy stored between the pole faces for a given movement in revolution of the rotor is increased.

5. In a rotary magnetic induction machine, a stator comprising a plurality of electro-magnetic units consisting of a central field pole arm with shield and two axially spaced surge pole arms with shields, field coils, generating coils, and a rotor with two peripheral flanges containing magnetic segments and non-magnetic segments with shields as set forth in claim 2, the space between the faces of the magnetic segments and the pole faces of the projecting pole arms being greater than required for clearance in rotation of the rotor to thereby increase the net total of magnetic energy stored between the pole faces for a given increment in the revolution of the rotor and increase the electrical generating capacity of the machine.

6. In a rotary magnetic induction machine, a series of electro-magnetic units each having a central field pole arm and two axially spaced surge pole arms, a field coil on the central arm, generating coils on the surge pole arms, magnetic shields on each of said field and pole arms, a rotor having two peripheral flanges composed of magnetic and non-magnetic segments and shields therefor all as set forth in claim 2, an electronic valve so connected to the generating coils as to prevent passage of current from a generating coil which, in its passage through said coil would deduct from the magneto-motive force provided by the field coil and so connected as to permit current passing from a generating coil which in its passage through either said generating coil or such coil and the field coil would add to the magneto-motive force produced by the field coil thereby causing the generation of a continuous direct current.

7. In a rotary magnetic induction machine having one or more electro-magnetic units consisting of a stationary field body having a plurality of pairs of projecting pole arms, field and generating coils for said body and pole arms respectively, magnetic shields for said pole arms and a rotor having alternate magnetic and non-magnetic segments all as set forth in claim 3, an electronic valve of such character and so connected with the generating coils as to permit generation of electric current adding to the magneto-motive force of the field coil from the decreasing surge of magnetic flux through the coils whereby through revolution of the rotor a continuous direct current is generated that will add to the magneto-motive force of the field.

8. In an induction generator having field and generating coils, the combination therewith of an electronic valve connected in series with the field and generating coils so that the reactance of said coils will assist in producing a direct current of uniform voltage.

9. In an induction generator, the combination of an electronic valve with a condenser of such capacity and so connected across the outside terminals of generating coils as to form a charging circuit for the condenser in which is included only the generating coils and the condenser so arranged that the discharge of the condenser is made through another circuit including an electronic valve.

10. In a rotary magnetic induction machine, a reinforced concrete frame member having a circular opening, a series of stator units, concrete blocks detachably secured on the wall of the opening to which the stator units are secured, and a rotor mounted in the frame for cooperation with the stator units, said detachable blocks providing a means whereby the stator units may be removed without disturbing the rotor or its mounting.

11. In a rotary magnetic induction machine, a series of stator units having a central magnetic field body and outer pole arms forming a plurality of incomplete magnetic circuits, a rotor having alternate magnetic and non-magnetic segments substantially as described, surge coils on the outer pole arms separate from the surge coils of the load circuit, a condenser and an electronic valve connected to these separate coils of the outer pole arms in such manner that through rotation of the rotor an outgoing magnetic segment will generate in the condenser surge coil of its pole arm, a current charging the condenser whereas an electronic valve prevents the surge coil of an incoming segment from also charging the condenser and further that when the condenser is discharging, the electronic valve in the respective circuit will prevent current passing back to the surge coil of the outgoing segment and permit the condenser to deliver its charge to the surge coil of the incoming segment.

12. In a rotary magnetic induction machine, a series of electro-magnetic units consisting of a central field body and relatively oppositely disposed pole arms, a rotor having alternate magnetic and non-magnetic segments substantially as described, a pair of field coils on the central pole arm, one connected in shunt with the load and the other connected in series with the load.

13. In a rotary magnetic induction machine, a series of electro-magnetic stator units consisting of a central magnetic field body and outer pole arms forming a plurality of incomplete magnetic circuits substantially as described, a rotor having a series of magnetic and non-magnetic segments for completing and interrupting the said circuits, said magnetic segments having a length measured in the direction of rotation of the rotor of approximately twice the length of the pole faces of the pole arms.

14. In a rotary magnetic induction machine for energizing a load circuit, a series of electro-magnetic stator units having a central field body and outer pole arms forming a plurality of incomplete magnetic circuits, a rotor having alternate magnetic and non-magnetic segments substantially as described, and a field coil on the central pole arm connected in shunt with the load circuit.

15. In a magnetic induction machine, a rotor composed of non-magnetic and non-conducting material having at least two peripheral flanges spaced apart on the axis of revolution, a series of magnetically permeable segments positioned in the respective flanges alternating with the non-magnetic portions of the flanges of approximately equal size, the arrangement being such that the magnetically permeable segments of each flange are axially opposite a non-magnetic portion of the adjacent flange.

16. In a rotary magnetic induction machine, a series of electro-magnetic units each having a central field pole arm and two axially and oppositely disposed surge pole arms, a field coil on the central pole arm, generating coils on the surge pole arms, magnetic shields on each of the said field and surge pole arms, a rotor having two axially spaced peripheral flanges composed of alternate magnetic and non-magnetic segments rotatable between the extremities of the center pole arm and the surge pole arms, the magnetic segment of each rotor flange being opposite a non-magnetic segment of the other flange, and electronic valves connected in series with the generating coils, field coils, and load circuit permitting flow of current in the generating coils resulting from increased reluctance in the respective magnetic circuits of the generating coils caused by outgoing movement of a magnetic rotor segment and thereby producing a direct current of electricity from the consecutive action of at least two generating coils together with the reactance of at least one series connected field coil.

17. In a magnetic induction machine, an electro-magnetic stator having a central field body, surge pole arms thereon providing two separate incomplete magnetic circuits interrupted by space gaps, an armature operating in the said gaps having magnetic and non-magnetic sections in alternate relation and of such size that the movement of the same relative to the surge pole arms will alternately add to the reluctance of one magnetic surge pole arm circuit at the same rate as it deducts from the reluctance of the other magnetic surge pole arm circuit, coils of insulated wire encircling the field body and the surge pole arms, said field and surge coils being connected in series with electronic valves and the load circuit, and a condenser connected between the terminals of the generating coils near where said terminals join the respective anodes of the electronic valves, the arrangement being such that the outgoing movement of a magnetic armature segment will consecutively cause, in the surge coils of the magnetic circuits thus interrupted by its movement, in cooperation with the condenser, the electronic valve and the reactance of the field coil, the generation of a direct current of electricity.

18. In a rotary magnetic induction machine, an electro-magnetic stator having a central field body and radially projecting surge pole arms providing a plurality of separate incomplete magnetic circuits interrupted by space gaps, coils of insulated wire encircling the field body and surge pole arms, said coils being connected in series in conjunction with electronic valves and the load circuit as set forth in claim 16, a rotor revolving in the said space gaps and having magnetic and non-magnetic segments of such shape and so located with respect to the surge pole arms that through said revolution in the space gaps the reluctance of the magnetic circuit of one surge pole arm is increased at the same rate as the reluctance of the next forward magnetic pole arm circuit is decreased, a condenser connected across like terminals of cooperating surge coils adjacent the connection to the anodes of the respective electronic valves.

19. In a magnetic induction machine, an electro-magnetic stator having a central field body and surge pole arms thereon forming two incomplete magnetic circuits interrupted by space gaps, a coil of insulated wire on the field body, a primary and a secondary surge coil on each of the surge pole arms, the inner terminals of the secondary coils being connected together and jointly connected to one terminal of the field coil, electronic valves connected in series with the outer terminals of the secondary coils, the load circuit and the other terminal of the field coil, a condenser connected across the outer terminals of the secondary surge coils, said arrangement of parts providing a means whereby as surges of direct current of electricity are alternately supplied to the primary surge coils, corresponding surges will be induced in the secondary coils and in cooperation with the condenser, electronic valves and reactance of the field coils, an approximately uniform direct current of electricity will be discharged to the load circuit.

20. In a magnetic induction machine, an electro-magnetic stator having a central field body and surge pole arms thereon, the magnetic circuit of which is interrupted by space gaps, field and surge coils on the field body and surge pole arms respectively, an electronic valve connected in series with the field and surge coils so that the reactance of the said coils due to a decreasing magnetic flux will combine to produce a direct current of electricity of uniform voltage.

21. In a magnetic induction machine having an electro-magnetic field body and projecting pole arms, magnetic shields covering certain portions of the pole arms, non-magnetic material separating the said shields from the pole arms, said shields providing a means for concentrating the magnetic flux on the unshielded faces of the pole arms.

22. In a magnetic induction machine having an armature composed of alternate magnetic and non-magnetic sections, magnetic shields on the non-magnetic sections of the armature in position to reduce the magnetic flux passing through the non-magnetic sections of the armature.

23. In a magnetic induction machine, an electro-magnetic stator having a central field body, surge pole arms thereon forming incomplete magnetic circuits interrupted by space gaps, coils of insulated wire on the field body and surge pole arms, a casing enclosing the field and surge coils, the space between the casing and the coils being filled with a liquid of high dielectric strength.

24. In a magnetic induction machine having an electro-magnetic stator provided with a central field body, surge pole arms thereon forming at least two magnetic circuits interrupted by space gaps, an armature having magnetic and non-magnetic segments movable through said space gaps, the arrangement permitting the increase of space between the face of the pole arm and the face of the magnetic segments beyond that required for clearance purposes to thereby increase the magnetic energy stored in the said space and increase the energy capacity of the machine.

25. In the circuit of a magnetic induction machine having a central field body and projecting surge pole arms with surge coils thereon, a commutator for directing surges of electric current to the surge coils, said commutator consisting of at least two rings of conducting material, each having alternately projecting segments intermeshing with and insulated one from the other, and a series of at least four stationary brushes so positioned that at least two of the brushes bear on the respective ring portions of the commutator and at least two more of the brushes bear on oppositely projecting, intermeshing segments of the commutator.

26. In a rotary magnetic induction machine having a plurality of electro-magnetic stator units each composed of a central field body having surge pole arms thereon forming at least two incomplete magnetic circuits interrupted by space gaps, a rotor having a peripheral flange formed of alternate segments of magnetic and non-magnetic material revolving in the said space gaps, the arrangement providing a construction in which one or several stator units may be magnetically energized without producing unbalanced radial strains on the rotor.

ELI WHITE.